United States Patent
Kaiser et al.

(10) Patent No.: US 7,756,542 B1
(45) Date of Patent: Jul. 13, 2010

(54) MANAGING A RADIO ENVIRONMENT WITHOUT LOCATION INFORMATION

(75) Inventors: Daryl A. Kaiser, Los Gatos, CA (US); Timothy S. Olson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1380 days.

(21) Appl. No.: 10/898,105

(22) Filed: Jul. 22, 2004

(51) Int. Cl.
*H04L 12/26* (2006.01)

(52) U.S. Cl. .................. 455/522; 455/69; 455/41.2; 455/63.1; 455/114.3; 455/115.1; 455/115.3; 455/127.5; 370/335

(58) Field of Classification Search .............. 370/252, 370/254, 901, 216, 338; 455/67.11, 115, 455/115.2, 115.3
See application file for complete search history.

(56) References Cited

U.S. PATENT DOCUMENTS

| | | | |
|---|---|---|---|
| 6,754,488 B1* | 6/2004 | Won et al. | 455/424 |
| 7,174,134 B2* | 2/2007 | Klein et al. | 455/69 |
| 2002/0082035 A1* | 6/2002 | Aihara et al. | 455/518 |
| 2003/0117985 A1* | 6/2003 | Fujii et al. | 370/338 |
| 2005/0153702 A1* | 7/2005 | Cuffaro et al. | 455/452.1 |

* cited by examiner

*Primary Examiner*—Charles N Appiah
*Assistant Examiner*—Randy Peaches
(74) *Attorney, Agent, or Firm*—Brinks Hofer Gilson & Lione (57) ABSTRACT

In an access point operating in a wireless local area network, a method is disclosed for assisting a radio manager to manage a radio environment without location information. By performing radio discovery to receive beacon signals from neighboring access points, an initial configuration of a radio environment is generated based on said received beacon signals. Measurements are received from a client device that performs measurements by a user walking through a desired coverage area while operating the client device and the radio configuration is adjusted based on the received measurements.

14 Claims, 4 Drawing Sheets

MANAGING A RADIO ENVIRONMENT WITHOUT LOCATION INFORMATION

FIELD OF THE INVENTION

The present invention relates broadly to configuration of wireless local area networks. Specifically, the present invention relates to configuring a wireless local area network without location information of client devices.

BACKGROUND

Use of wireless networks such as wireless local area networks (WLANs) is becoming widespread. With the proliferation of WLANs, network security is also becoming more and more important. WLANs present important network security concerns.

A WLAN may be ad hoc, in that any client device (referred to herein as a client) may communicate directly with any other client, or have an infrastructure in which a client can only communicate with another client via an access point device (AP). Problems specific to WLANs arise from wireless clients requesting access to the various APs. Often in a deployment of a WLAN environment, AP cells' coverages are overlapped to achieve maximum RF coverage to reduce non-service spots. Wireless clients can move between APs, and thus change the RF environment of the WLAN depending on their location. Additionally, WLANs are often required to grow with increased demand as more and more clients require service from the WLAN. Expanding the WLAN requires reconfiguring equipment, adding APs, and placing APs in locations that do not conflict with other APs or otherwise complicate managing the WLAN.

Another WLAN management challenge is the detection of clients that should not have access to the WLAN, such as in the case where a wireless client interferes with the WLAN simply by occupying space that is peripheral to the WLAN. This may happen when a wireless device is legitimately deployed in an area near the WLAN, such as in an adjacent office building or parking lot, or simply when someone with a wireless client device enters the WLAN coverage area with a legitimate purpose, such as making a delivery or visiting the WLAN site for other reasons. In such situations, reconfiguration of the WLAN is often necessary, and APs again must be repositioned or reconfigured.

Yet another WLAN challenge occurs when changes are required in the placement of wireless clients served by the WLAN. For example, one or more floors in an office building or several buildings are included in a typical WLAN coverage area. Rearrangement of furniture, placement of walls, doors, and RF sources such as copiers, computers, telephone systems and the like can affect the coverage area by contributing to interference and transmission path loss and require the APs to be placed in different locations to adequately serve their respective wireless clients.

Thus, deployment, expansion, and day-to-day management of a WLAN are nontrivial tasks that require significant time, effort and skills. There is a heartfelt need for methods and equipment to efficiently manage these tasks and provide WLAN managers with information needed to make management decisions.

SUMMARY

The present invention addresses the problems described above and simplifies the deployment, expansion and day-to-day management of WLANs by automatically configuring network-wide radio parameters during initial deployment and network expansion, continuously monitoring the radio environment, adapting robustly to interferers, and alerting a WLAN administrator to radio network changes, as well as providing information to help visualize the network radio topology, including the path loss between APs as well as the AP-client links.

In an embodiment, the WLAN administrator deploys a new WLAN as described below. After installing hardware, the APs establish trusted relationships with the campus context manager (CCM). Radio parameters are auto-configured based on AP Radio discovery measurements. If necessary, client walkabouts are performed to gather signal strength measurements, and radio parameters can be re-configured using these measurements. When a network is first installed, the WLAN administrator positions APs based on heuristic guidance and applies power without any time coordination. Optionally, the WLAN administrator may perform a site survey to optimize the AP placement. Site surveys can range from a quick coverage check using a client utility to detailed signal strength measurements using a third-party tool. After placement and power-up, each AP scans a frequency band to find a usable channel. In an embodiment, the Radio Manager generates a network-wide radio configuration overriding these initial settings. The WLAN administrator initiates radio discovery, auto-configuration and client walkabout measurements at the WLAN Network Manager (WNM) interface. AP Radio discovery involves APs broadcasting beacon signals and simultaneously listening for beacon signals from neighboring APs. The resulting measurements between APs are used to generate an initial radio configuration for the WLAN. Client walkabout measurements are not accompanied by location information, but sets of measurements correspond to specific locations in the WLAN coverage area. The Radio Manager uses these measurement sets to create measurement objects that contain data representing path losses to the strongest controlled APs and received signal strengths from uncontrolled sources at specific locations. A new radio configuration can be generated for the WLAN, using the additional information from the client walkabouts.

DETAILED DESCRIPTION

The WLAN administrator initiates AP radio discovery at deployment and schedules AP radio discovery during brief maintenance periods when the WLAN is not in use (e.g., 2:00 AM each morning). The result of AP radio discovery is a snapshot of the RF interference at each AP and a set of signal strength measurements indicating the strength level at which each AP receives each neighboring AP's signal. Directing attention to FIG. 1, a WLAN configuration having AP 1, AP 2, AP 3, AP 4, AP 5 and AP 6 and radio manager 10 and wireless network manager (WNM) 14 are shown. When the APs perform radio scans in accordance with the present invention is performed, APs are determined not in terms of physical location, but mapped in terms of signal strength received from each AP's neighboring APs. In other words, each AP is described in terms of what other APs the AP can detect, in terms of signal strength. For example, in accordance with the present invention, AP 4 is defined as AP 1 (50); AP 2 (55); AP 3 (58); AP 5 (56). In this example, AP 6 is not detected by AP 4, and thus is not included in the definition of AP 4. The values defining AP 4 are stored in a database maintained by radio manager 10. Radio manager 10 uses each AP's current transmission signal strength level to compute the path loss between each AP that the APs can detect. The computed path loss is saved in a database to characterize the RF environment, such as potential coverage redundancy in a set of 802.11 stations associated with a single AP (referred to herein as BSS), and overlap on the downlink. When the neighboring AP is not controlled, radio manager 10 saves the received signal strength. Radio manager 10 sets all controlled APs to transmit at their highest power level and then steps down through subsequent levels to characterize each AP's true power steps. AP Radio discovery is accomplished in the following event sequence. Radio manager 10 commands all APs to scan passively for RF energy over a predetermined time interval and return the results. This action is performed to detect uncontrolled 802.11 WLAN stations and interferers. Radio manager 10 uses the AP scan results to choose one test frequency for all APs in a particular region. Radio manager 10 sets all APs in a particular region to transmit beacons on the selected frequency at maximum transmit power. Each AP is assigned a unique beacon interval to minimize collisions. Radio manager 10 then commands each AP to report beacons that it receives from other APs along with accompanying signal strengths. This action is repeated with APs transmitting at each successively lower power level until reaching the lowest setting.

Figure 1:
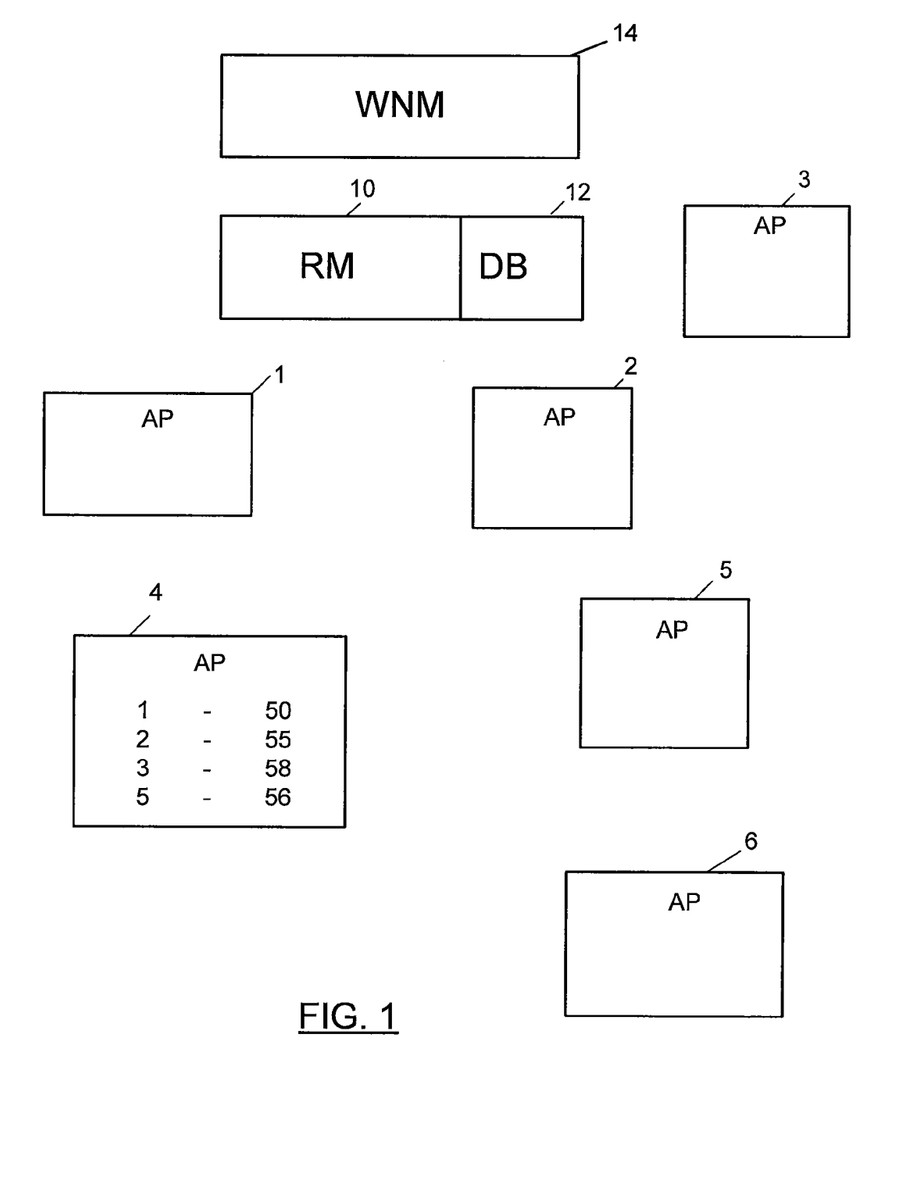
FIG. 1 illustrates placement of APs in a WLAN and measurements taken during radio discovery.

In an embodiment, radio manager 10 uses the measured signal strength to calculate path loss information from AP to AP and from client location to AP. With this calculated path loss information and the configured power and channel settings of each AP, neighboring APs suffering from black holes are identified.

After AP Radio discovery and initial radio configuration, the WLAN administrator may initiate one or more client walkabouts. In a walkabout, a person walks around a coverage area while holding a client device, so that measurements can be gathered and all detected APs reported. The gathered information is used to characterize the RF environment of the WLAN, such as potential BSS coverage redundancy and overlap on the downlink. At the WNM user interface, the administrator specifies the media access control (MAC) addresses of clients from which the controlled APs will request frequent measurements, typically at five-second intervals. The WLAN administrator may select a walkabout with APs transmitting at maximum power or at the levels used during normal operation. During the walkabout, the WLAN administrator is not required to remain in a particular location for any length of time. Client measurements are taken quickly enough to allow the WLAN administrator to continue walking throughout the desired coverage area. Radio manager 10 makes requests to the client device 20 through the AP that is currently serving client 20, instructing client 20 to make a particular measurement. Typically, client 20 is requested to measure the signal strength of all beacon signals it can detect at any given spot at one point in time, and return the recorded signal strength indicator (RSSI) values of the received beacon signals. Where client 20 loses association from all APs, the WLAN administrator records the location. As the WLAN administrator walks the coverage area, the serving AP changes as its client moves from one BSS to another. As long as client 20 remains inside the coverage area, the serving AP continuously commands client 20 to measure and report the signal strength and background RF energy it receives from neighboring APs. All measurements are passed to radio manager 10, which incorporates them into its RF environment database 12. Database 12 provides data used to compute the next radio configuration. By performing radio discovery and client walkabout as described above, radio manager 10 is able to visualize the radio environment of the WLAN.

In an embodiment, the WLAN administrator can also walk through the coverage area using an 802.11 sniffer, such as available from Kismet Wireless, Inc., to locate the APs that can be seen at signal strengths sufficient to cause black hole problems among neighboring APS. Regardless of how black holes are detected among neighboring APS, either through transmitting beacon signals at stepped intervals or using an 802.11 sniffer during the walkabout, once black holes are detected, the APs suffering this problem are adjusted by radio manager 10 instructing each AP to change its beacon signal interval so that it is staggered with respect to the neighboring AP also suffering the black hole problem. The process of black hole detection can be an iterative process, performed after each occurrence of a black hole is corrected. This ensures that whatever beacon interval an AP selects to correct the detected black hole problem does not create a new black hole with a different, neighboring AP. In the preferred embodiment, skewing the beacon signals by one or two milliseconds with respect to the neighboring AP in the black hole is sufficient to prevent any extended period of time during which a black hole can occur.

During normal operation, radio manager 10 gathers RF statistics and identifies specific signal sources. This allows radio manager 10 to monitor the RF environment, and indicate when new APs appear, and roughly locate clients. Radio manager 10 may request measurements from APs and clients to monitor the WLAN RF environment. These measurements occur less frequently than during the walkabout, typically one or more minutes apart. Radio manager 10 typically asks only the clients to measure non-serving channels, allowing APs to remain on their serving channels to better serve their respective BSSs.

Each radio configuration includes parameters of AP channel, AP transmit power, BSS data rates, and BSS power limit. In computing a new radio configuration, radio manager 10 may be given free reign to select various combinations of parameters, or it may be limited to particular range of values for some or all of these parameters on some or all APs. After computing a new radio configuration, radio manager 10 quantifies the expected system performance and then waits for direction from WNM 14, which may request another configuration using a new set of constraints or may apply the computed radio parameters to the WLAN.

After the WLAN is deployed, radio manager 10 continuously collects measurements and monitors the RF state of the WLAN. Radio manager 10 alerts WNM 14 to changes that may require radio reconfiguration, but waits for further direction from WNM 14 before computing a new radio configuration and again before applying new radio parameters to the WLAN. Every action by radio manager 10 is made in response to a command received from WNM 14. This makes WNM 14 responsible for managing the degree of reconfiguration autonomy granted to the entire system by the WLAN administrator. The WLAN administrator uses the WNM interface to specify the conditions, if any, under which radio parameters may be automatically changed. All other conditions require explicit approval at each instance.

In a preferred embodiment, nightly measurements are performed automatically to check the RF state of the WLAN. These measurements are typically scheduled in a WNM job that runs AP Radio discovery early each morning, perhaps at 2:00 AM. During this brief maintenance time, which could last about a minute, the WLAN becomes unavailable while the APs change channels and power levels. After the new measurements have been accumulated, the WLAN reverts to its previous state and resumes normal operation. Radio manager 10 consolidates the new measurements into its radio environment database and alerts the WLAN administrator of any anomalies.

Radio manager 10 alerts WNM 14 whenever it detects a new AP's beacon during normal operation. At the administrator's command, WNM instructs radio manager 10 to ask all new APs to scan the radio spectrum and report their results. Meanwhile, existing APs and clients detect the new APs' beacons. The combination of measurements from the new APs, existing APs and clients provide the information to reconfigure the WLAN to best incorporate the new APs. If desired, the WLAN administrator may perform another client walkabout in the vicinity of the new APs.

During normal operation, APs and clients measure the 802.11 traffic load at their location on the serving channel. The traffic load at the AP is best managed by dynamic load balancing. High traffic loads at client locations may indicate inter-BSS contention, which can be remedied by an improved radio configuration. If a client reports a load that is much higher than its serving AP, it may indicate contention from stations (also referred to herein as STAs) in a neighboring BSS. In response to this condition, radio manager 10 schedules measurements to capture frames from the neighboring clients and/or AP to identify the BSS and the number of clients responsible for the contention. This information is used to serve two purposes. First, radio manager 10 consolidates and sends it to WNM 14 to use for performance visualization. Second, the information may prompt WNM 14 to ask radio manager 10 to suggest a new radio configuration that incorporates the new information and achieves better overall performance, possibly by reducing the transmit power in one BSS or by reassigning channels.

During normal operation, APs and clients, referred to herein collectively as stations (STAs) measure the non-802.11 interference strength at their locations on the serving channel. In addition, clients measure received interference strength on alternative channels. When radio manager 10 receives reports that indicate non-802.11 interference, it correlates the measurements to locate the interferer, if possible, and alerts WNM 14. The response by WNM 14 depends on the number of reporting STAs, severity and duration of the interference. If a small number of clients report moderate interference, WNM 14 may simply inform the clients of their situation. If the interference is persistent, pervasive and severe, WNM 14 may ask radio manager 10 to suggest a new radio configuration to avoid the interferer.

During normal operation, each client may detect a condition where another client is hidden from it. The WLAN administrator uses the WNM interface to specify when and how to act on this information. These instructions are sent by radio manager 10 to each AP. Clients may be instructed to periodically report hidden stations so that APs may take corrective action by lowering the ready to send (RTS) thresholds of the hidden clients. As a result, the serving AP clears the channel by issuing a clear to send (CTS) notification before either of the clients transmits data, which alleviates the hidden node problem.

Radio manager 10 gains knowledge of the WLAN radio environment through measurement reports obtained from APs and clients. An embodiment of the present invention introduces five types of radio measurement reports: Beacon Reports, Frame Reports CCA Reports, received power indicator (RPI) Histograms, and Hidden Node Reports, each of which indicates a particular RF characteristic or reports a particular RF event.

Beacon and Frame Reports identify sources of 802.11 contention. CCA Reports and RPI Histogram Reports characterize the degree of contention and interference. Hidden Node Reports identify stations colliding within the same BSS.

Figure 2:
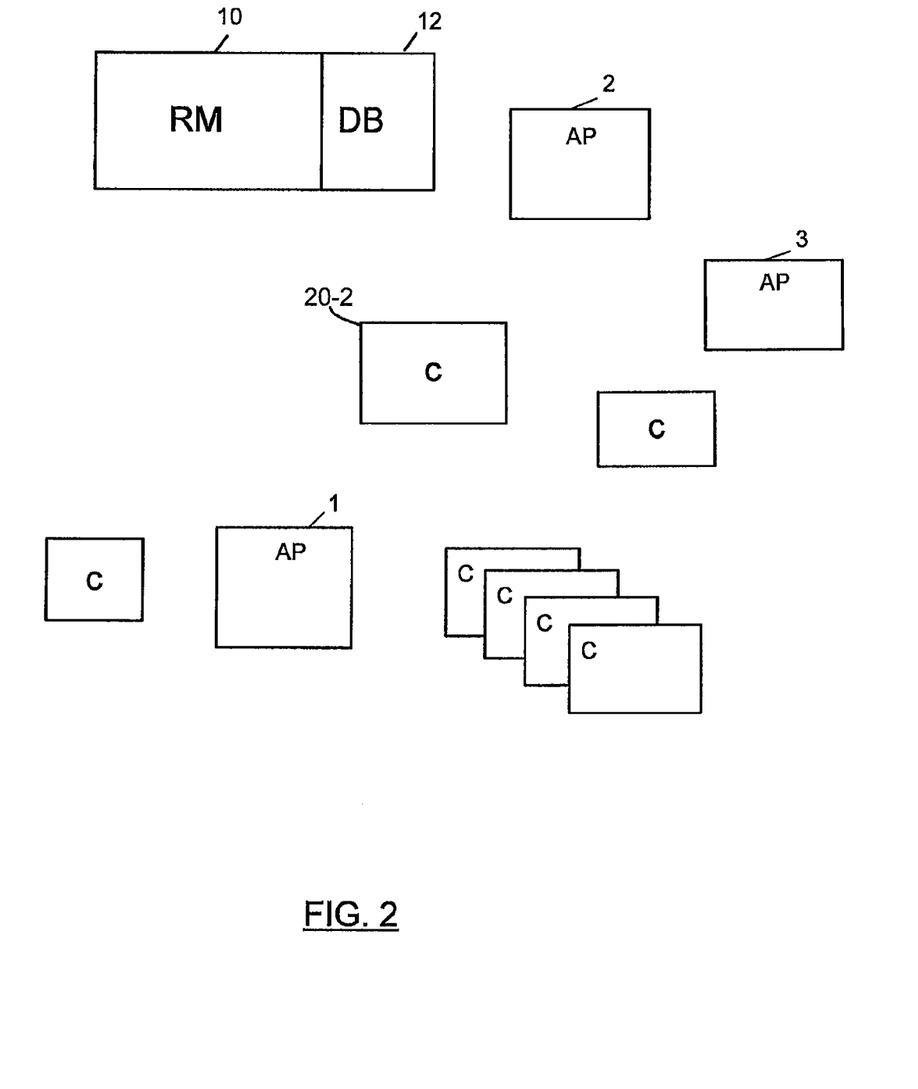
FIG. 2 illustrates a network configuration in which radio measurements are introduced by embodiments of the present invention.

FIG. 2 illustrates the radio measurements introduced by embodiments of the present invention. As shown, the measuring client and one other client are associated with AP 1, but neither client detects the other's signal. AP 2 is close enough to be detected by the measuring client. AP 3 is out of range, but the measuring client does detect some of its associated clients.

Measuring client 20-2 issues a Beacon Report identifying AP 2 as a source of 802.11 contention. Client 20-2 issues a Frame Report indicating contention from a client in another BSS, and identifies AP 3 as the BSS access point. Measuring client 20-2 reports significant contention due to clients in another BSS. After receiving this report, radio manager 10 may request a Frame Report, which would identify AP 3 as the destination of the contending frames. Measuring client 20-2 issues a RPI Histogram Report indicating intermittent, non-802.11 interference and describing the statistics of its received strength. Measuring client 20-2 issues a Hidden Node Report identifying another client in its BSS that appears to be hidden from it.

CCA and RPI Histogram Reports must achieve statistical significance and are therefore utilize measurements having longer durations (e.g., 60 seconds). Beacon, Frame and Hidden Node Reports capture and summarize 802.11 frames to identify specific signal sources. Beacon Reports utilize measurements having shorter durations (e.g., 1 second or less). Frame and Hidden Node Reports typically filter out most of the STA's received traffic and report on a small subset. These reports utilize measurements having medium to longer durations.

Figure 3:
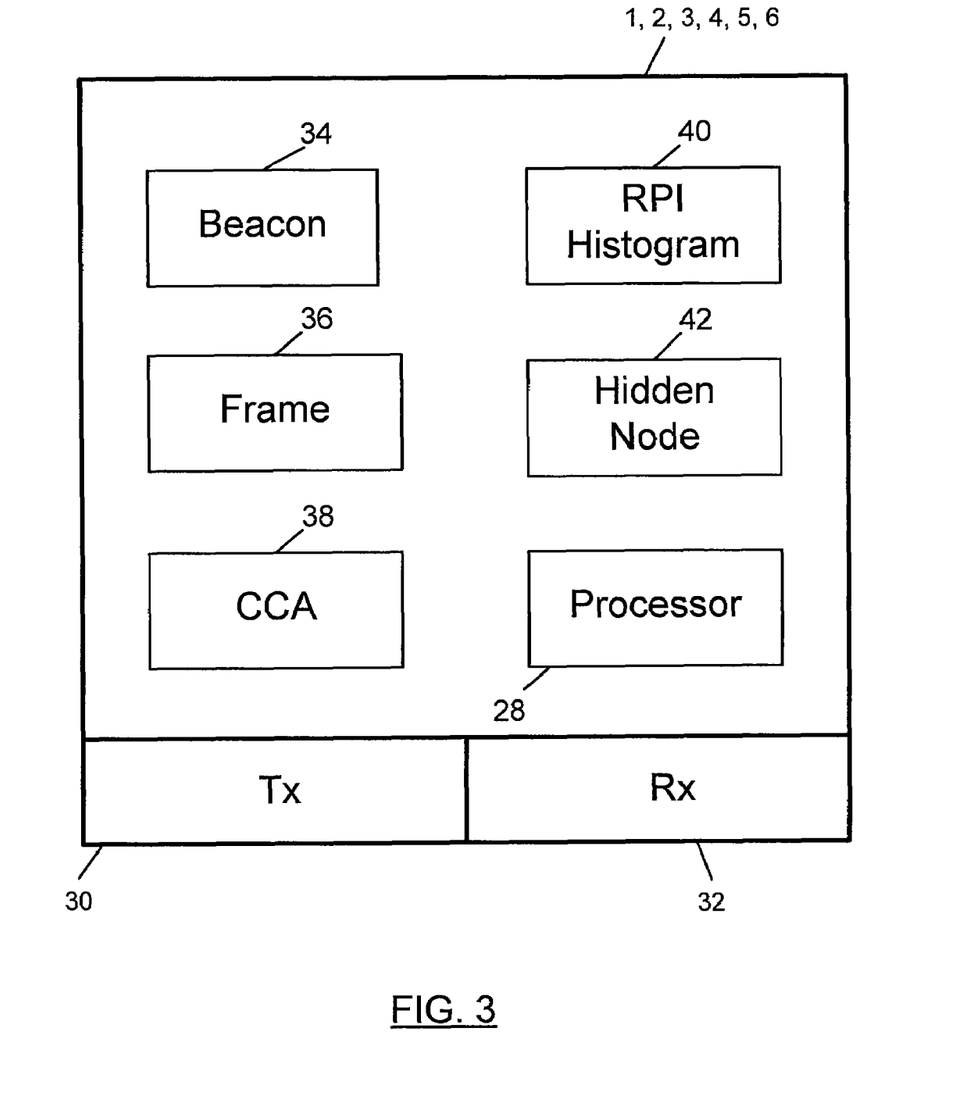
FIG. 3 illustrates an exemplary access point device containing measurement modules used in accordance with embodiments of the present invention.

FIG. 3 illustrates an AP in accordance with embodiments of the present invention. In the preferred embodiment, AP 1,2,3,4,5,6 includes processor 28 that executes software modules 34, 36, 38, 40, and 42 for operatively controlling transmitter 30 and receiver 32 to perform the radio measurements of the present invention. Those skilled in the art will know that these software modules can also be implemented as firmware or circuitry as desired in various embodiments.

Beacon measurement module 34 performs measurements to obtain received signal strength, identity and body of neighbor AP beacon or probe response, and generates a message containing this information. AP 1,2,3,4,5,6 send beacon signals to identify themselves to neighboring devices. During walkabout and AP discovery, beacon measurement module 34 measures radio connectivity of APs and characterize potential BSS downlink coverage. During normal operation, beacon measurement module 34 monitors known APs, detects new APs, and roughly locates clients. Frame measurement module 36 obtains signal strength of neighboring STAs and identity of their respective BSS and generates a message containing this information. During walkabout and AP discovery, frame measurement module 36 identifies uncontrolled STAs to be avoided in the radio configuration. During normal operation, frame measurement module 36 identifies contending neighbor STAs (controlled or not). Clear channel assessment (CCA) measurement module 38 measures the fraction of time that an STA observes a channel busy with 802.11 traffic and generates a message containing this information. During walkabout and AP discovery, CCA module 38 finds channels already busy with 802.11 traffic to avoid in radio configuration. During normal operation, CCA measurement module 38 characterizes 802.11 contention at reporting STA's locations. RPI Histogram measurement module 40 measures received strength and statistics of non-802.11 energy and generates a message containing this information. During walkabout and AP discovery, RPI Histogram measurement module 40 find channels with non-802.11 RF energy to avoid in radio configuration, if possible. During normal operation, RPI Histogram measurement module 40 monitors STAs for new non-802.11 RF energy and alarm, if appropriate. Hidden Node measurement module 42 is not used in walkabouts or AP discovery, but during normal operation improves AP performance by enabling dynamic hidden station control. The messages generated by modules 34, 36, 38, 40, 42 can be transmitted by transmitter 30 to radio manager 10, stored in database 12 and passed to WNM 14.

Radio manager 10 may request a STA to measure on its serving channel or on another channel. When measuring on the serving channel, the STA continues its normal traffic processing while concurrently accumulating the measurement. When measuring on a non-serving channel, the STA must postpone normal traffic and dedicate itself to the measurement since it cannot operate on two channels simultaneously.

During AP Radio discovery, radio manager 10 typically requests APs to scan multiple channels and then assigns one channel and requests beacon reports on that channel. During client walkabout, radio manager 10 requests the walkabout clients to measure on the serving channel and on non-serving channels. During normal operation, radio manager 10 requests APs to measure on their serving channels and clients to measure on serving and non-serving channels.

Radio manager 10 may request Beacon Reports on a serving or non-serving channel. Beacon Reports ask the measuring STA to report both beacons and probe responses. The Beacon Report may be requested of any STA, and typically contains information such as received signal strength, transmitting station address, computed TSF offset between detected BSS and serving BSS, beacon interval, capability information, SSID and supported rates.

The purpose of the Beacon Report is to discover and monitor the presence of neighboring APs, regardless of whether they are controlled by radio manager 10. This helps radio manager 10 characterize the overlap of cochannel BSSs and the redundancy of other-channel BSSs on the downlink. The Beacon Report is used during AP Radio discovery, Client walkabout and normal operation. The transmitting station address identifies the neighbor AP to radio manager 10. In an embodiment, the computed TSF offset allows the serving AP to schedule brief measurements of signal strength from the particular neighbor AP. The signal strength helps radio manager 10 assess the overlap of cochannel BSSs and the coverage redundancy of other-channel BSSs. If two cochannel BSSs contain power-save clients, in an embodiment, the computed TSF offset is used to instruct each AP to schedule its multicast traffic in a manner that is less likely to collide with its neighbor's traffic.

Radio manager 10 may request Frame Reports on a serving or non-serving channel. Frame Reports may be requested of any STA. The Frame Report summarizes each 802.11 frame received from a STA in another BSS, and includes information such as received signal strength, transmitting station address, receiving station address, and frame type and length. The purpose of the Frame Report is to identify STAs that belong to another BSS but are located within radio range of the measuring STA. It also identifies the BSS to which the contending STAs belong. This report helps characterize and monitor the region of uplink RF influence of each neighboring BSS. This includes BSSs controlled by radio manager 10 and BSSs that are not under its control.

Radio manager 10 may request CCA Reports on a serving or non-serving channel. It is typically scheduled to run concurrently with normal traffic processing on the serving channel or in parallel with other dedicated measurements on a non-serving channel. This report may be requested of any STA. The report contains the CCA Busy Fraction. The CCA Busy Fraction measures the accumulated duration of all packets divided by the measurement interval length. This value includes successful packets and erroneous packets. The value range is 0-255, where 0 represents no traffic and 255 represents traffic occurring 100% of the time.

Radio manager 10 may request Received Power Indicator (RPI) Histogram Reports on a serving or non-serving channel. The RPI Histogram Report conveys the relative fraction of time during which RF energy from non-802.11-decodable sources falls into each of eight different received power ranges. The RPI Histogram report provides a measurement of RF energy due to a combination of background noise and background signals, including non-802.11 devices and 802.11 devices whose signals cannot be properly decoded. The histogram helps radio manager 10 assess the non-802.11-decodable RF energy contending with the WLAN at different locations. This information helps radio manager 10 to decide the best channel for each BSS in the vicinity of the measuring STA.

Radio manager 10 may request a Hidden Node Report from clients as a concurrent measurement on the serving channel. The Hidden Node Report includes the received signal strength and destination address of 802.11 frames sent by the serving AP for which the measuring client detected no acknowledgement. The purpose of the Hidden Node Report is to discover and monitor clients within the same BSS that are hidden from each other. This report helps radio manager 10 decide the best transmit power for each BSS and the appropriate RTS threshold for the hidden nodes, if it has a means of setting these thresholds at the clients.

Figure 4:
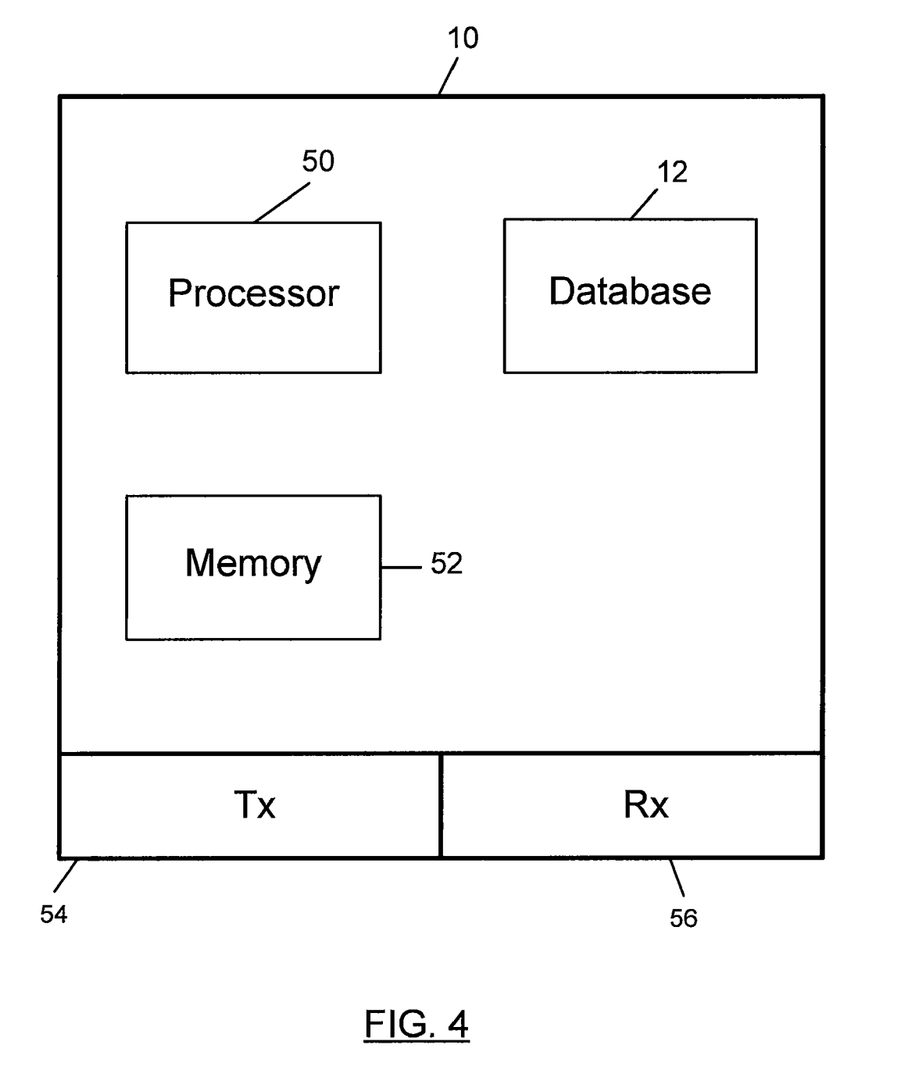
FIG. 4 illustrates an exemplary access radio manager device used in accordance with embodiments of the present invention.

FIG. 4 illustrates the functional components of radio manager 10. Besides database 12, described above, radio manager 10 also includes processor 50, memory 52, transmitter 54 and receiver 56. Transmitter 54 communicates the requests described above to APs and clients, as well as radio configuration information to WNM 14. Receiver 56 receives the report information described above from the APS and clients, as well as instructions from WNM 14.

While a method, computer program product, and apparatus for managing a radio environment without location information have been described and illustrated in detail, it is to be understood that many modifications can be made to various embodiments of the present invention without departing from the spirit thereof.

What is claimed is:

1. In an access point operating in a wireless local area network, a method for assisting a radio manager to manage a radio environment without location information, the method comprising:

performing radio discovery to receive a beacon signal from a neighboring access point that is operative to repetitively transmit the beacon signal at different signal strengths;

determining a signal strength of the beacon signal received from the neighboring access point;

generating an initial radio configuration of a radio environment based on said received signal strength of the beacon signal;

receiving measurements from a client device that performs measurements by a user walking through a desired coverage area while operating the client device; and adjusting the initial radio configuration based on the received measurements, wherein performing radio discovery comprises initially receiving said beacon signal at a maximum power setting and iteratively receiving said beacon signal at reduced power level settings until the beacon signal is received at a lowest power level setting.

2. The method of claim 1, further comprising reporting the receipt of said beacon signals to a radio manager.

3. The method of claim 1, further comprising reporting the received measurements to a radio manager.

4. The method of claim 1, further comprising detecting background radio frequency levels and reporting them to a radio manager.

5. In a radio manager operating to control access points in a wireless local area network, a method for managing a radio environment without location information, the method comprising:

directing a plurality of access points to perform radio discovery;

receiving data from said plurality of access points, said received data describing signal strength of beacon signals received by an access point from neighboring access points;

calculating path loss information using the signal strength of the beacon signals;

identifying neighboring access points suffering from black holes using the calculated path loss information; and iteratively adjusting the neighboring access points suffering from black holes in order to correct black holes without creating a new black hole with a different neighboring access point.

6. The method of claim 5, wherein said received data describes measurements performed by a client device as the client device moves through a desired coverage area.

7. The method of claim 5, wherein directing the access points to perform radio discovery comprises directing the access points to transmit beacon signals at various signal strengths and report received signal strengths to said radio manager.

8. The method of claim 5, wherein directing the access points to perform radio discovery comprises directing the access points to transmit beacon signals at a maximum signal strength and iteratively transmit beacon signals at successively lower signal strengths until a beacon signal is transmitted at a lowest power setting.

9. A computer-readable memory comprising instructions, which, when executed by a computer, assist a radio manager to manage a wireless local area network without location information, by:

performing radio discovery to receive beacon signals from neighboring access points that repetitively transmit said received beacon signals at varying signal strengths;

generating an initial radio configuration of a radio environment based on said received beacon signals;

receiving measurements from a client device that performs measurements by a user walking through a desired coverage area while operating the client device; and adjusting the radio configuration based on the received measurements, wherein performing radio discovery comprises initially receiving said beacon signals at a maximum power setting and iteratively receiving said beacon signals at reduced power level settings until the beacon signal is received at a lowest power level setting.

10. A computer-readable memory comprising instructions, which, when executed by a computer, manages a radio environment without location information, by:

directing a plurality of access points to perform radio discovery to receive beacon signals from neighboring access points that repetitively transmit said received beacon signals at varying signal strengths;

using data received from said plurality of access points to characterize a radio environment, characterization of the radio environment including identifying neighboring access points in a black hole; and configuring the wireless local area network in response to said characterization, the wireless local area network being configured such that beacon signals are skewed with respect to neighboring access points in the black hole, wherein configuring the wireless local area network includes iteratively adjusting the neighboring access points in the black hole in order to correct the black hole without creating a new black hole with a different neighboring access point.

11. The computer-readable medium of claim 10, wherein the beacon signals are skewed by an interval that is sufficient to prevent an extended period of time during which the black hole can occur.

12. The computer-readable medium of claim 11, wherein the interval is one or two milliseconds.

13. An access point device for use in a wireless local area network, the access point device serving wireless clients, the access point device comprising:

a transmitter for transmitting signals to a client device, and for transmitting beacon signals to inform other devices of the existence of said access point device, and for transmitting the existence of detected access points and received signal strength data related to said detected access points to a radio manager; and a receiver for receiving signals from a client device, and for receiving beacon signals from other access point devices that repetitively transmit the beacon signals at different signal strengths and detecting background radio frequency energy, and for receiving instructions from said radio manager, said instructions related to configuring a wireless local area network without location information of access points, wherein the receiver initially receives said beacon signals at a maximum power setting and iteratively receives said beacon signals at reduced power level settings until the beacon signal is received at a lowest power level setting.

14. An access point device for use in a wireless local area network, the access point device serving wireless clients, the access point device comprising:

means for transmitting signals to a client device;

means for transmitting beacon signals to inform other devices of the existence of said access point device;

means for transmitting the existence of detected access points and received signal strength data related to said detected access points to a radio manager;

means for receiving signals from a client device;

means for receiving beacon signals from other access point devices and detecting radio frequency energy, said beacon signals being initially received at a maximum power setting and iteratively received at reduced power level settings until the beacon signal is received at a lowest power level setting;

means for determining signal strengths of the beacon signals from the radio frequency energy;

means for generating an initial radio configuration of a radio environment based on the signal strengths of the beacon signals;

means for receiving instructions from said radio manager, said instructions related to configuring a wireless local area network without location information of access points; and means for configuring the wireless local area network using the instructions.

\* \* \* \* \*